US009995535B2

(12) United States Patent
Harris

(10) Patent No.: US 9,995,535 B2
(45) Date of Patent: Jun. 12, 2018

(54) HEAT PIPE FOR VEHICLE ENERGY-STORAGE SYSTEMS

(71) Applicant: Faraday&Future Inc., Gardena, CA (US)

(72) Inventor: W. Porter Harris, Los Angeles, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 276 days.

(21) Appl. No.: 14/866,949

(22) Filed: Sep. 26, 2015

(65) Prior Publication Data

US 2017/0003082 A1 Jan. 5, 2017

Related U.S. Application Data

(60) Provisional application No. 62/186,977, filed on Jun. 30, 2015.

(51) Int. Cl.
*F28D 15/00* (2006.01)
*F28D 15/02* (2006.01)
(Continued)

(52) U.S. Cl.
CPC ......... *F28D 15/02* (2013.01); *B60H 1/00392* (2013.01); *H01M 2/206* (2013.01);
(Continued)

(58) Field of Classification Search
CPC ... F28D 15/02; H01M 10/613; H01M 10/625; H01M 10/6552; H01M 10/6568;
(Continued)

(56) References Cited

U.S. PATENT DOCUMENTS 4,883,116 A * 11/1989 Seidenberg ........... F28D 15/043
122/366
5,060,114 A * 10/1991 Feinberg ............... H01L 23/433
165/185

(Continued)

FOREIGN PATENT DOCUMENTS

EP 2270918 1/2011
EP 2482362 8/2012
(Continued)

OTHER PUBLICATIONS

Written Opinion in International Application No. PCT/US2016/039884, dated Oct. 19, 2016.
(Continued)

*Primary Examiner* — Justin Jonaitis
(74) *Attorney, Agent, or Firm* — Knobbe Martens Olson & Bear LLP

(57) ABSTRACT

Provided are cooling subsystems for a vehicle energy-storage system comprising a heat pipe disposed between two battery modules, the heat pipe being thermally coupled to each of a plurality of cells of the two battery modules at an end of each cell. The heat pipe comprises an envelope and a working fluid, the heat pipe transferring heat from the plurality of cells. Optionally, the cooling subsystem further includes a heat exchanger thermally coupled to the heat pipe, the heat exchanger receiving heat from the heat pipe.

17 Claims, 11 Drawing Sheets

(51) Int. Cl.
  *H01M 10/625* (2014.01)
  *H01M 10/6568* (2014.01)
  *H01M 10/6552* (2014.01)
  *H01M 10/613* (2014.01)
  *B60H 1/00* (2006.01)
  *H01M 10/6569* (2014.01)
  *H01M 2/20* (2006.01)
  *H01M 10/0525* (2010.01)
  *H01M 2/10* (2006.01)
  *H01M 10/643* (2014.01)
  *H01M 10/617* (2014.01)

(52) U.S. Cl.
  CPC ..... *H01M 10/0525* (2013.01); *H01M 10/613* (2015.04); *H01M 10/625* (2015.04); *H01M 10/6552* (2015.04); *H01M 10/6568* (2015.04); *H01M 10/6569* (2015.04); *H01M 2/1077* (2013.01); *H01M 10/617* (2015.04); *H01M 10/643* (2015.04); *H01M 2220/20* (2013.01)

(58) Field of Classification Search
  CPC ............ H01M 10/6569; H01M 2/206; H01M 10/0525; H01M 10/617; H01M 10/643; H01M 2/1077; H01M 2220/20; B60H 1/00392
  USPC .................................................... 165/104.21
  See application file for complete search history.

(56) References Cited

U.S. PATENT DOCUMENTS

| | | | |
|---|---|---|---|
| 5,879,833 A | 3/1999 | Yoshii et al. | |
| 7,479,346 B1 | 1/2009 | Chow et al. | |
| 8,039,139 B2 * | 10/2011 | Kruger | H01M 10/625 429/120 |
| 8,057,928 B2 | 11/2011 | Kohn et al. | |
| 2001/0046624 A1 | 11/2001 | Goto et al. | |
| 2006/0035138 A1 | 2/2006 | Jones | |
| 2006/0216582 A1 * | 9/2006 | Lee | H01M 2/1077 429/120 |
| 2007/0190409 A1 * | 8/2007 | Sakurai | H01G 2/04 429/159 |
| 2008/0138698 A1 | 6/2008 | Ogami et al. | |
| 2009/0023059 A1 | 1/2009 | Kinoshita et al. | |
| 2009/0211277 A1 | 8/2009 | Rummel et al. | |
| 2009/0220852 A1 | 9/2009 | Fujii | |
| 2009/0274952 A1 | 11/2009 | Wood et al. | |
| 2009/0297892 A1 | 12/2009 | Ijaz et al. | |
| 2010/0047682 A1 | 2/2010 | Houchin-Miller et al. | |
| 2010/0216004 A1 | 8/2010 | Yoon | |
| 2010/0285346 A1 * | 11/2010 | Graban | H01M 2/1077 429/120 |
| 2011/0045334 A1 | 2/2011 | Meintschel et al. | |
| 2011/0059346 A1 | 3/2011 | Jeong et al. | |
| 2011/0097617 A1 | 4/2011 | Gu et al. | |
| 2011/0135975 A1 | 6/2011 | Fuhr et al. | |
| 2012/0177970 A1 | 7/2012 | Marchio et al. | |
| 2012/0177971 A1 | 7/2012 | Cicero et al. | |
| 2012/0183930 A1 | 7/2012 | Schaefer et al. | |
| 2013/0157102 A1 | 6/2013 | Nagamatsu et al. | |
| 2013/0306353 A1 | 11/2013 | Zhao | |
| 2013/0344362 A1 | 12/2013 | Raisch et al. | |
| 2014/0154548 A1 * | 6/2014 | Dillmann | H01M 10/5004 429/120 |
| 2014/0335381 A1 | 11/2014 | Krolak | |
| 2014/0335390 A1 | 11/2014 | Hwang et al. | |
| 2014/0342216 A1 | 11/2014 | Kohlberger | |
| 2015/0188203 A1 | 7/2015 | Enomoto et al. | |
| 2015/0194713 A1 | 7/2015 | Jin et al. | |
| 2016/0172727 A1 | 6/2016 | Chan et al. | |

FOREIGN PATENT DOCUMENTS

| | | |
|---|---|---|
| EP | 2738833 | 6/2014 |
| RU | 2324263 C2 | 5/2008 |
| RU | 124842 U1 | 2/2013 |
| WO | WO 2007/047317 | 4/2007 |
| WO | WO 2008/109764 | 9/2008 |
| WO | 2010044553 A2 | 4/2010 |
| WO | WO 2011/149868 | 12/2011 |
| WO | WO 2013/056877 | 4/2013 |
| WO | WO 2013/155700 | 10/2013 |
| WO | WO 2015/041149 | 3/2015 |

OTHER PUBLICATIONS

Written Opinion in International Application No. PCT/US2015/064838, dated Apr. 4, 2016.
Office Action in U.S. Appl. No. 14/866,907, dated Jan. 10, 2017.
International Search Report for International Application No. PCT/US2017/015449 dated Jun. 1, 2017.

* cited by examiner

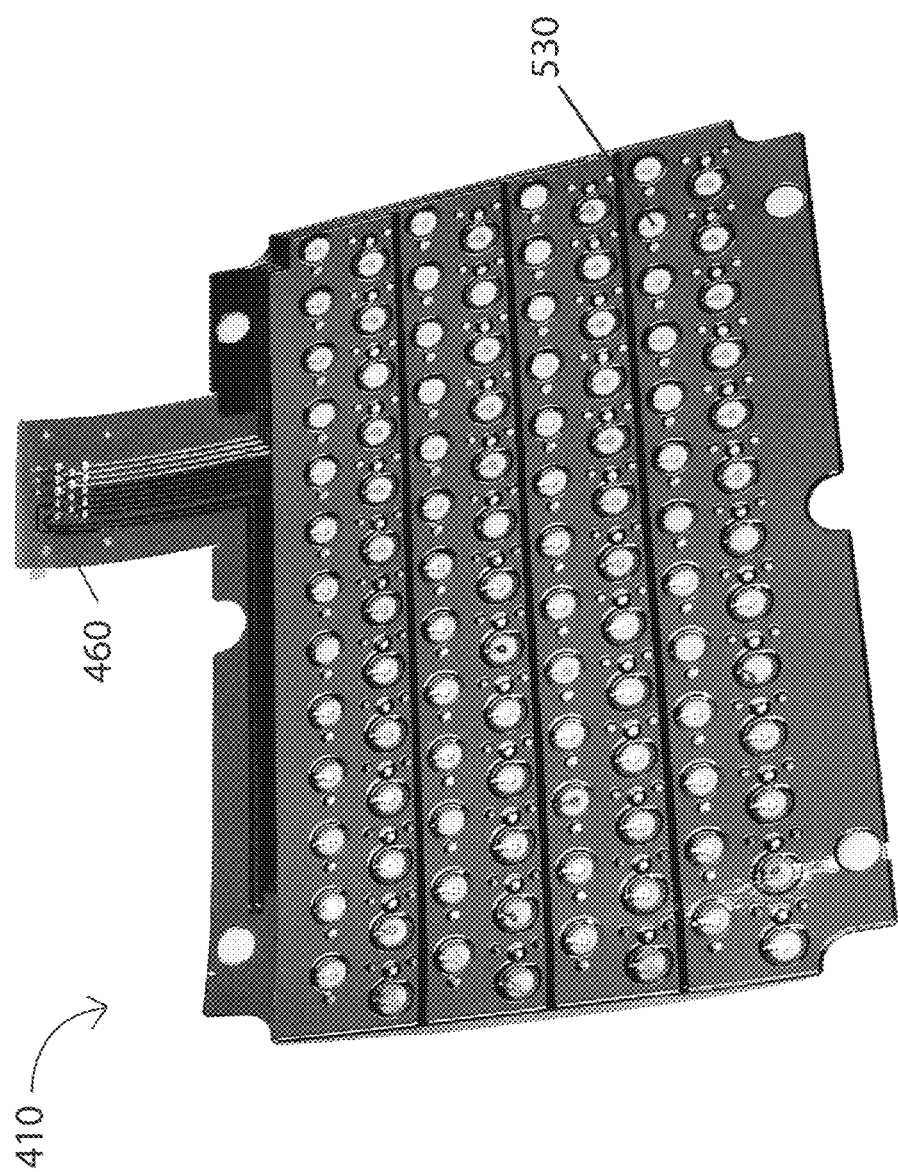

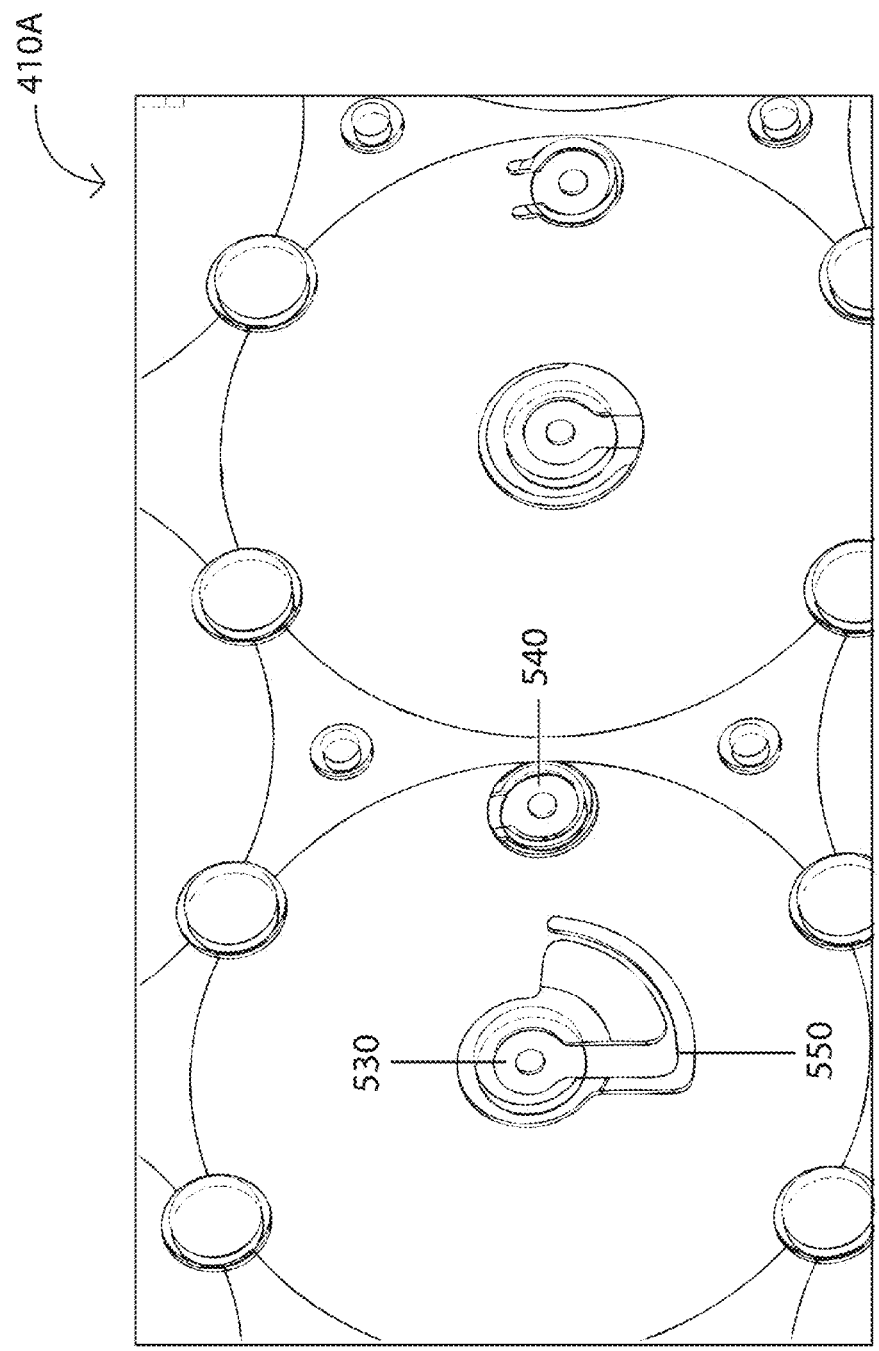

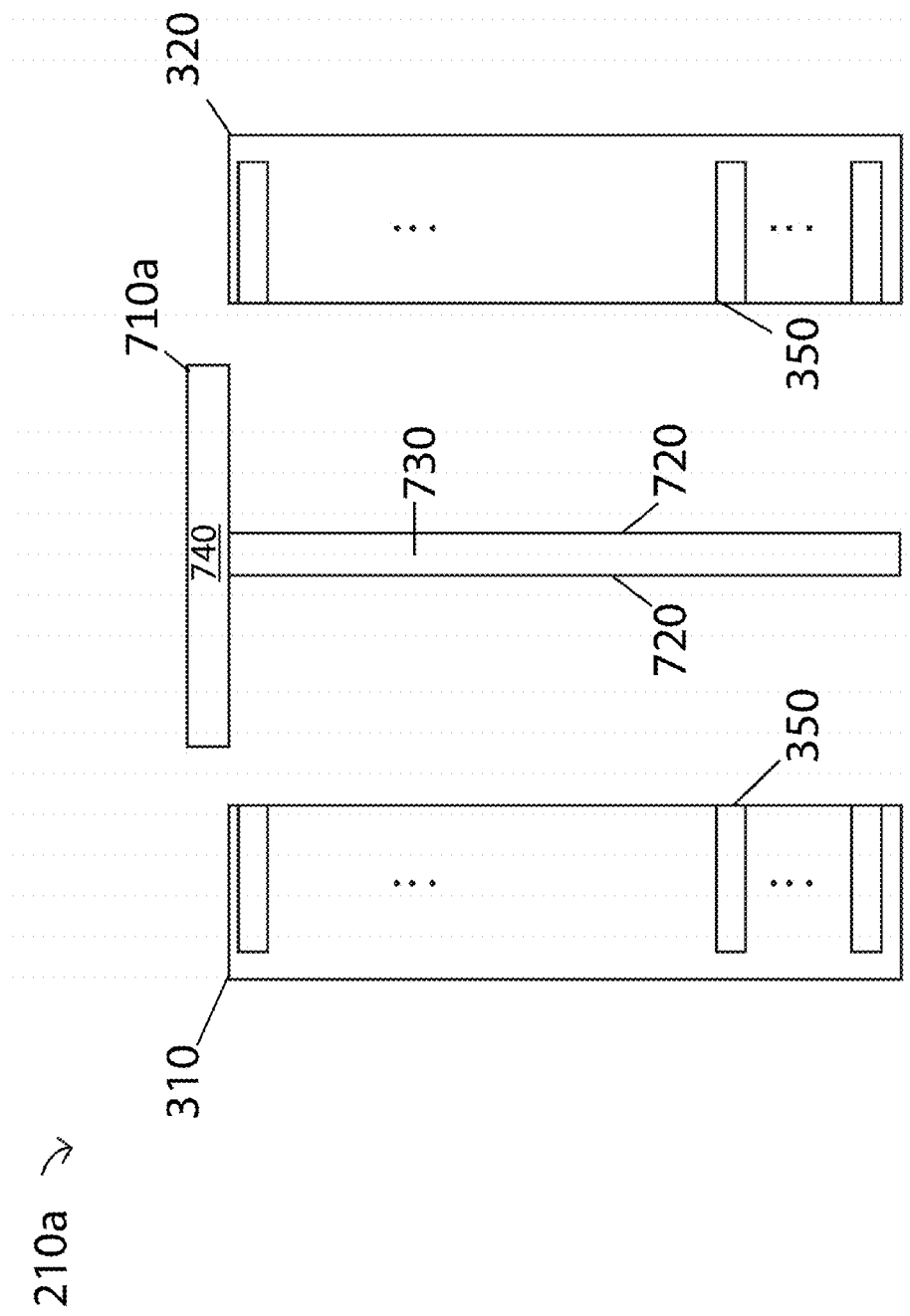

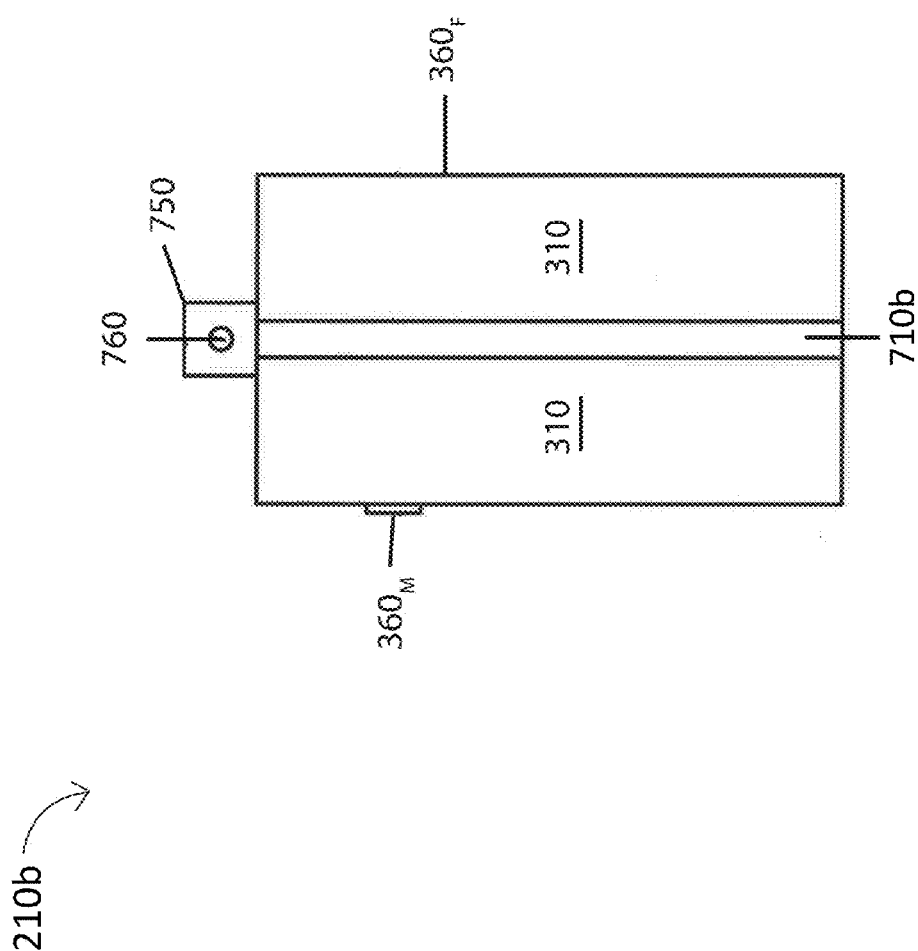

HEAT PIPE FOR VEHICLE ENERGY-STORAGE SYSTEMS

CROSS-REFERENCE TO RELATED APPLICATIONS

This application claims the benefit of U.S. Provisional Application No. 62/186,977 filed on Jun. 30, 2015. This application is related to U.S. patent application Ser. No. 14/841,617 filed on Aug. 31, 2015. The subject matter of the aforementioned applications is incorporated herein by reference for all purposes.

FIELD

The present application relates generally to heat transfer, and more specifically to heat transfer for vehicle energy-storage systems.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. However, present energy-storage systems have disadvantages including large size, inefficiency, and poor safety, to name a few. Similar to many sophisticated electrical systems, heat in automotive energy-storage systems should be carefully managed. Current thermal management schemes consume an inordinate amount of space. Present energy-storage systems also suffer from inefficiencies arising variously from imbalance among battery cells and resistance in various electrical connections. In addition, current energy-storage systems are not adequately protected from forces such as crash forces encountered during a collision.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present disclosure may be directed to a cooling subsystem for a vehicle energy-storage system comprising: a heat pipe disposed between two battery modules, the heat pipe being thermally coupled to each of a plurality of cells of the two battery modules at an end of each cell, the heat pipe comprising an envelope and a working fluid, the heat pipe transferring heat from the plurality of cells.

BRIEF DESCRIPTION OF THE DRAWINGS

Embodiments are illustrated by way of example and not limitation in the figures of the accompanying drawings, in which like references indicate similar elements.

FIGS. 5A and 5B show a current carrier, according to various embodiments.

FIGS. 7A-7C illustrate further embodiments of a battery module.

DETAILED DESCRIPTION

Figure 1:
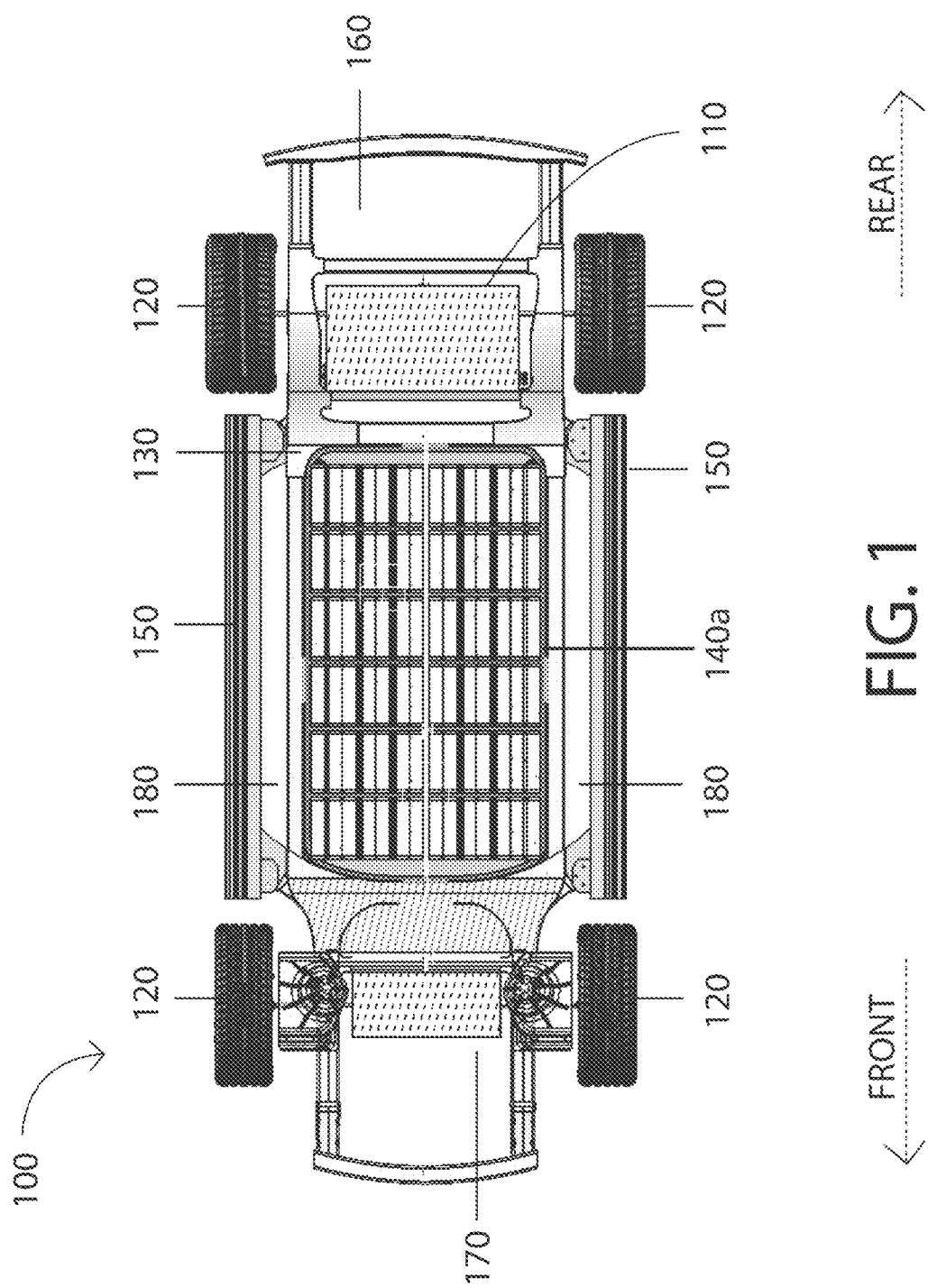
FIG. 1 illustrates an example environment in which an energy-storage system can be used.

While this disclosure is susceptible of embodiment in many different forms, there are shown in the drawings and will herein be described in detail several specific embodiments with the understanding that the present disclosure is to be considered as an exemplification of the principles of the disclosure and is not intended to limit the disclosure to the embodiments illustrated. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Some embodiments of the present invention can be deployed in a wheeled, self-powered motor vehicle used for transportation, such as hybrid electric vehicles, plug-in hybrid electric vehicles, and all-electric vehicles. For example, FIG. 1 illustrates electric car 100. Electric car 100 can be an automobile propelled by one or more electric motors 110. Electric motor 110 can be coupled to one or more wheels 120 through a drivetrain (not shown in FIG. 1). Electric car 100 can include frame 130 (also known as an underbody or chassis). Frame 130 can be a supporting structure of electric car 100 to which other components can be attached/mounted, such as, for example, a battery pack 140a. Battery pack 140a can supply electricity to power one or more electric motors 110, for example, through an inverter. The inverter can change direct current (DC) from battery pack 140a to alternating current (AC), as can be required for electric motors 110, according to some embodiments.

As depicted in FIG. 1, battery pack 140a may have a compact "footprint" and be at least partially enclosed by frame 130 and disposed to provide a predefined separation, for example, from structural rails 150 of an upper body that couples to frame 130. Accordingly, at least one of a rear crumple zone 160, front crumple zone 170, and lateral crumple zone 180 can be formed around battery pack 140a.

Both the frame 130 and structural rails 150 may protect battery pack 140a from forces or impacts exerted from outside of electric car 100, for example, in a collision. In contrast, other battery packs which extend past at least one of structural rails 150, rear crumple zone 160, and front crumple zone 170 remain vulnerable to damage and may even explode in an impact.

Battery pack 140a may have a compact "footprint" such that it may be flexibly used in and disposed on frame 130 having different dimensions. Battery pack 140a can also be disposed in frame 130 to help improve directional stability (e.g., yaw acceleration). For example, battery pack 140a can be disposed in frame 130 such that a center of gravity of electric car 100 is in front of the center of the wheelbase (e.g., bounded by a plurality of wheels 120).

Figure 2A:
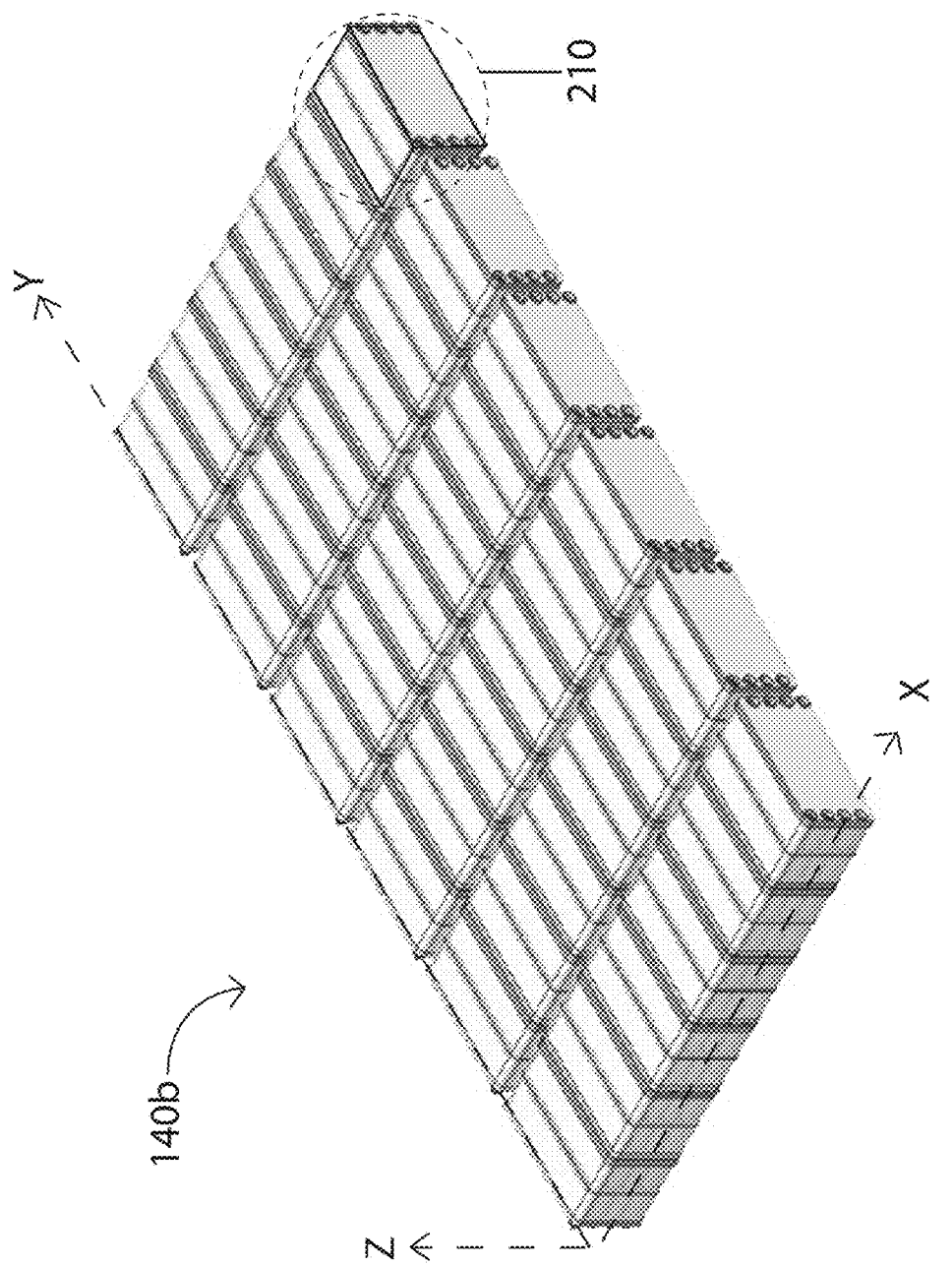
FIG. 2A shows an orientation of battery modules in an energy-storage system, according to various embodiments of the present disclosure.

FIG. 2A shows battery pack 140b with imaginary x-, y-, and z-axis superimposed, according to various embodiments. Battery pack 140b can include a plurality of battery modules 210. In a non-limiting example, battery pack 140b can be approximately 1000 mm wide (along x-axis), 1798 mm long (along y-axis), and 152 mm high (along z-axis), and includes 36 of battery modules 210.

Figure 2B:
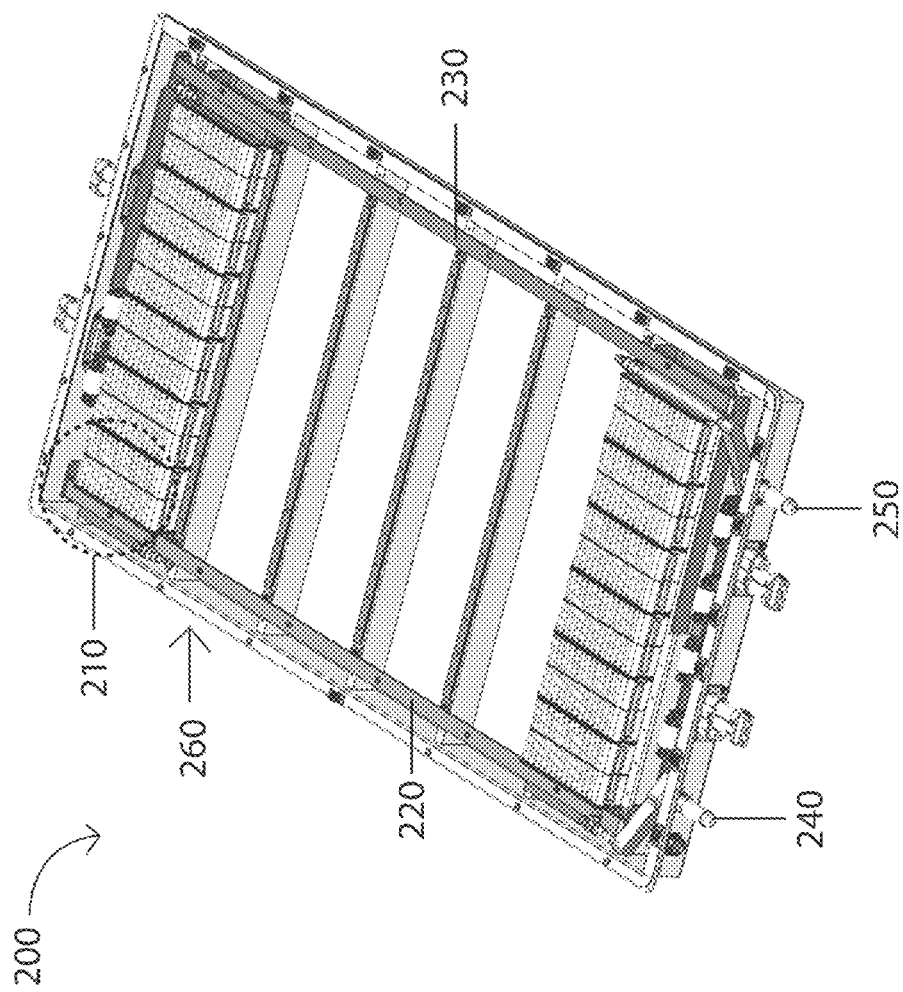
FIG. 2B depicts a bottom part of an enclosure of a partial battery pack such as shown in FIG. 2A.

FIG. 2B illustrates exemplary enclosure 200 for battery pack 140b having a cover removed for illustrative purposes. Enclosure 200 includes a tray 260 and a plurality of battery modules 210. Tray 260 may include positive bus bar 220 and negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 can be electrically coupled to positive terminal 240 of enclosure 200. Negative bus bar 230 can be electrically coupled to negative terminal 250 of enclosure 200. As described above with reference to FIG. 1, because bus bars 220 and 230 can be within structural rails 150, they can be protected from collision damage.

According to some embodiments, negative bus bar 230 and positive bus bar 220 are disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140b) due to a deformity caused by an impact.

As will be described further in more detail with reference to FIG. 4, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140b (e.g., along the z-axis), in various embodiments.

The x-axis cell orientation of battery modules 210 in battery pack 140b shown in FIGS. 2A and 2B can be advantageous for efficient electrical and fluidic routing to each of battery module 210 in battery pack 140b. For example, at least some of battery modules 210 can be electrically connected in a series (forming string 212), and two or more of string 212 can be electrically connected in parallel. This way, in the event one of string 212 fails, others of string 212 may not be affected, according to various embodiments.

Figure 3:
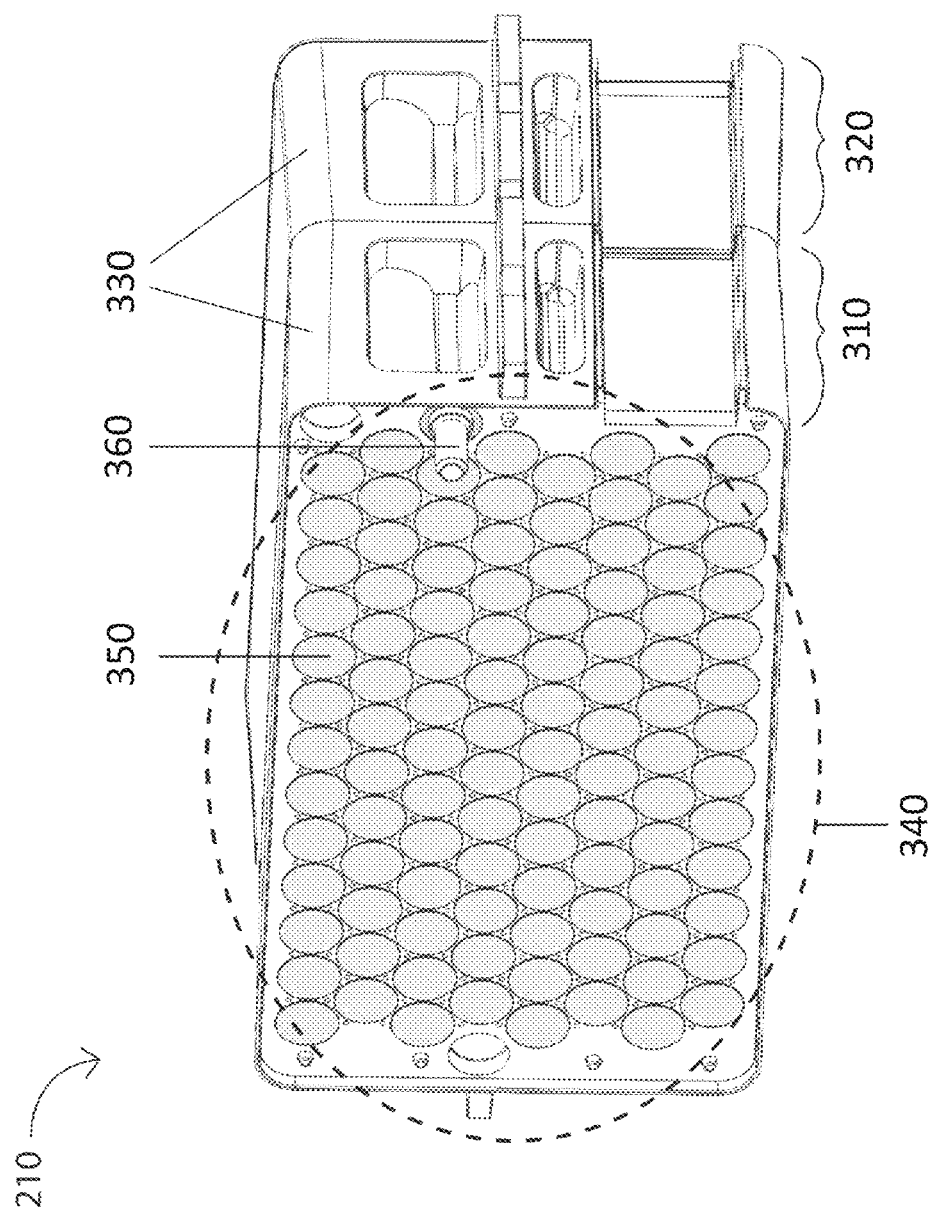
FIG. 3 is a simplified diagram of a battery module, according to various embodiments of the present disclosure.

FIG. 3 illustrates battery module 210 according to various embodiments. Main power connector 360 can provide power from battery cells 350 to outside of battery module 210. In some embodiments, battery module 210 includes two half modules 310 and 320 each having respective enclosure 330. Enclosure 330 may be made using one or more plastics having sufficiently low thermal conductivities. Respective enclosures 330 of each of two half modules 310 and 320 may be coupled with each other to form the housing for battery module 210.

FIG. 3 includes view 340 of enclosure 330 (e.g., with a cover removed). For each of half modules 310, 320 there is shown a plurality of battery cells 350 oriented (mounted) horizontally (see also FIG. 4). By way of non-limiting example, each half module includes 104 of battery cells 350. By way of further non-limiting example, eight of battery cells 350 are electrically connected in a series (e.g., the staggered column of eight battery cells 350 shown in FIG. 3), with a total of thirteen of such groups of eight battery cells 350 electrically connected in series. By way of additional non-limiting example, the thirteen groups (e.g., staggered columns of eight battery cells 350 electrically coupled in series) are electrically connected in parallel. This example configuration may be referred to as "8S13P" (8 series, 13 parallel). Other combinations and permutations of battery cells 350 electrically coupled in series and/or parallel maybe used.

Additional thermal runaway control is provided in various embodiments by scoring on end 640 (identified in FIG. 6) of the battery cell 350. The scoring promotes rupturing to effect venting in the event of excessive pressure.

Figure 4:
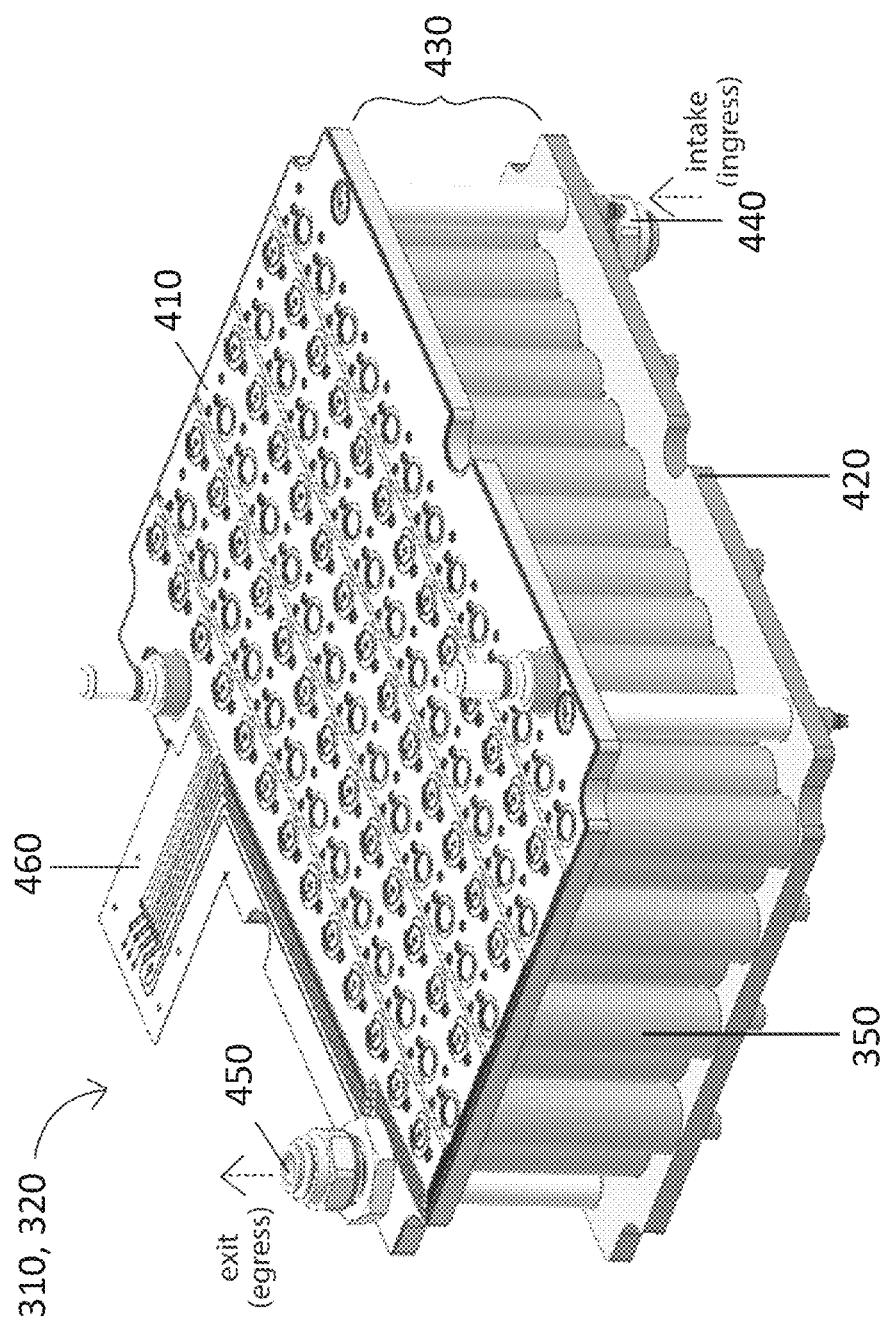
FIG. 4 illustrates a half module, in accordance with various embodiments.

FIG. 4 depicts a view of half module 310, 320 without enclosure 330 in accordance with various embodiments. Half modules 310 and 320 need not be the same, e.g., they may be mirror images of each other in some embodiments. Half modules 310 and 320 can include a plurality of battery cells 350. The plurality of battery cells 350 can be disposed between current carrier 410 and blast plate 420 such that an exterior side of each of battery cells 350 is not in contact with the exterior sides of other (e.g., adjacent) battery cells 350. In this way, coolant can circulate among and between battery cells 350 to provide submerged, evenly distributed cooling. In addition, to save the weight associated with coolant in areas where cooling is not needed, air pockets can be formed using channels craftily designed in space 430 between current carrier 410 and blast plate 420 not occupied by battery cells 350.

Coolant can enter half modules 310, 320 through coolant intake 440, be optionally directed by one or more flow channels, circulate among and between the plurality of battery cells 350, and exits through coolant outtake 450. In some embodiments, coolant intake 440 and coolant outtake 450 can each be male or female fluid fittings. In some embodiments, coolant or cooling fluid is at least one of: synthetic oil such as poly-alpha-olefin (or poly-α-olefin, abbreviated as PAO) oil, ethylene glycol and water, liquid dielectric cooling based on phase change, and the like. Compared to techniques using metal tubes to circulate coolant, submerged cooling improves a packing density of battery cells 350 (e.g., inside battery module 210 and half modules 310, 320) by 15%, in various embodiments.

FIGS. 5A and 5B depict current carrier 410, 410A according to various embodiments. Current carrier 410, 410A is generally flat (or planar) and comprises one or more layers (not shown in FIGS. 5A and 5B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 410) to outside of battery module 210.

As depicted in FIG. 5B, current carrier 410A can be a magnified view of a portion of current carrier 410, for illustrative purposes. Current carrier 410A can be communicatively coupled to each of battery cells 350, for example, at separate fused positive (+) portion 530 and separate negative (−) portion 540 which may be electrically coupled to the positive power plane and negative power plane (respectively) of current carrier 410A, and to each cathode and anode (respectively) of battery cell 350. In some embodiments, positive (+) portion 530 is laser welded to a cathode terminal of battery cell 350, and negative (−) portion 540 is laser welded to an anode terminal of battery cell 350. In some embodiments, the laser-welded connection has on the order of 5 milli-Ohms resistance. In contrast, electrically coupling the elements using ultrasonic bonding of aluminum bond wires has on the order of 10 milli-Ohms resistance. Laser welding advantageously has lower resistance for greater power efficiency and can take less time to perform than ultrasonic wire bonding, which contribute to greater performance and manufacturing efficiency.

Current carrier 410A can include fuse 550 formed from part of a metal layer (e.g., copper, aluminum, etc.) of current carrier 410A, such as in the positive power plane. In some embodiments, fuse 550 is formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 350 (e.g., due to an internal short circuit), the fuse may "blow," breaking the electrical connection to battery cell 350 and electrically isolating battery cell 350 from current carrier 410A. Although an example of a fuse formed in the positive power plane was provided, a fuse may additionally or alternatively be a part of the negative power plane.

Additional thermal runaway control is provided in various embodiments by scoring on end 640 (identified in FIG. 6) of battery cell 350. The scoring promoting rupturing to effect venting in the event of over pressure. In various embodiments, all battery cells 350 may be oriented to allow venting into blast plate 420 for both half modules 310, 320.

In some embodiments, current carrier 410 is comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers (FEP), and copolymers.

In addition to electrically coupling battery cells 350 to each other (e.g., in series and/or parallel), current carrier 410 provides electrical connectivity to outside of battery module 210, for example, through main power connector 360 (FIG. 3). Current carrier 410 may also include electrical interface 460 (FIGS. 4, 5A) which transports signals from the signal plane. Electrical interface 460 can include an electrical connector (not shown in FIG. 4, 5A).

Figure 6:
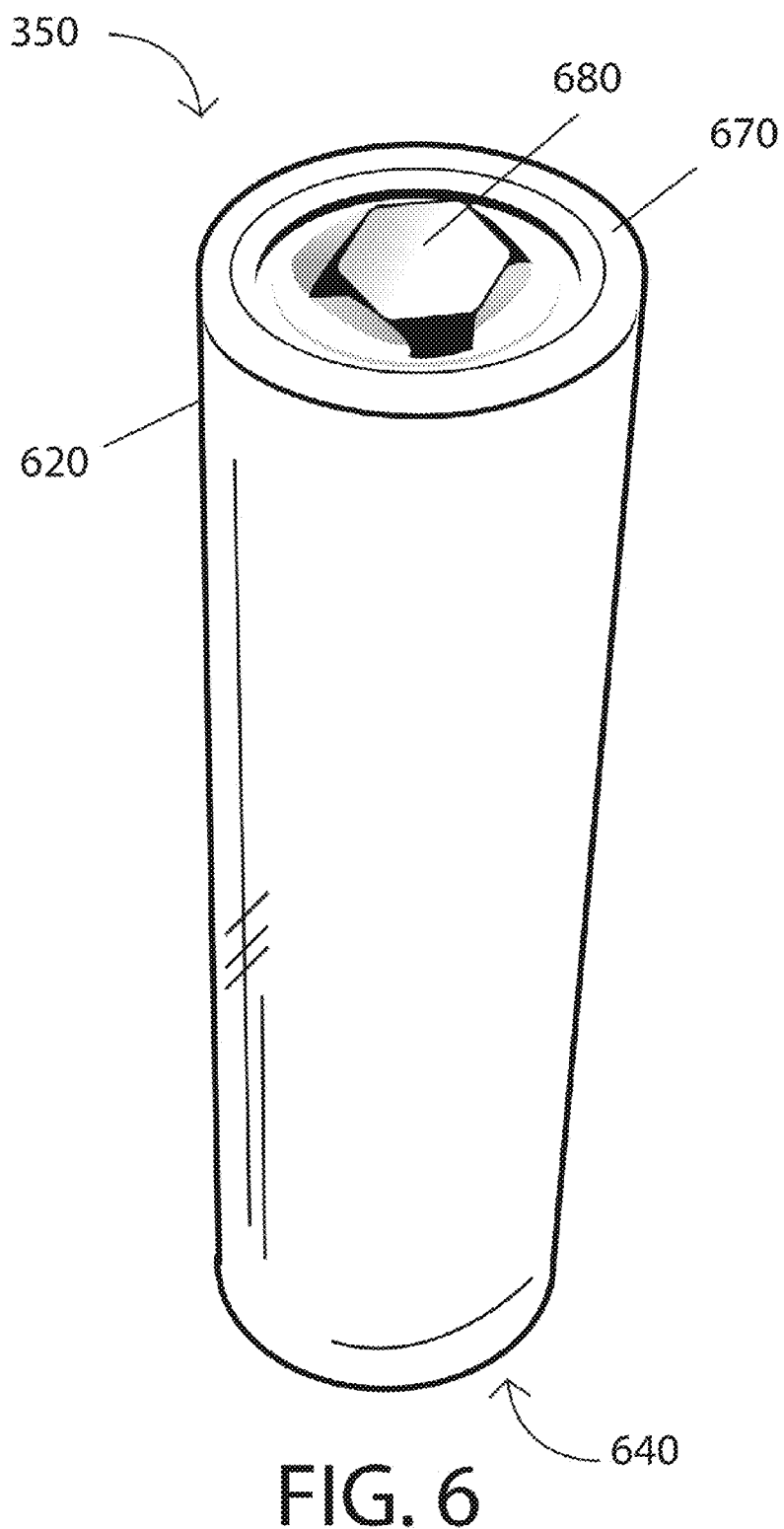
FIG. 6 depicts an example battery cell.

FIG. 6 shows battery cell 350 according to some embodiments. In some embodiments, battery cell 350 can be a lithium-ion (li-ion) battery. For example, battery cell 350 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 350 may include can 620 (e.g., the cylindrical body), anode terminal 670, and cathode terminal 680. For example, anode terminal 670 can be a negative terminal of battery cell 350 and cathode terminal 680 can be a positive terminal of battery cell 350. Anode terminal 670 and cathode terminal 680 can be electrically isolated from each other by an insulator or dielectric.

FIG. 7A illustrates an apparatus for heat transfer in battery module 210a, according to some embodiments. Battery module 210a can comprise two half modules 310 and 320 and battery cells 350, as were described in relation to FIG. 3. Half modules 310 and 320 may include a plurality of battery cells 350 which may be oriented (mounted) horizontally. In some embodiments, battery module 210a does not include blast plate 420 (FIG. 4).

According to some embodiments, battery module 210a can include heat pipe 710a. Heat pipe 710a can comprise two side surfaces 720 which are thermally coupled to battery cells 350, for example, at end 640 (FIG. 6). In various embodiments, side surfaces 720 can (also) be mechanically coupled to end 640 of battery cells 350, for example, using a thermal adhesive or glue (e.g., thermally conductive two-part epoxy resin). In some embodiments, heat pipe 710a can be thermally coupled and electrically isolated from battery cells 350 using dielectric separation having (extremely) low electrical conductivity. For example, an exterior surface of heat pipe 710a (including side surfaces 720) comprises at least one of: aluminum oxide, diamond powder based materials, boron nitride, and the like. Heat pipe 710a can transfer heat from battery cells 350.

An envelope (e.g., enclosure) of heat pipe 710a may comprise at least one thermally conductive material, such as aluminum, copper, steel, stainless steel, and a high-performance alloy (e.g., Hastelloy, Inconel, Waspaloy, Rene alloys, Haynes alloys, Incoloy, MP98T, TMS alloys, and CMSX single crystal alloys). The envelope of heat pipe 710a can enclose a working fluid, such as ammonia, ethanol, methanol, water, refrigerant (e.g., R134a), nitrogen, oxygen, neon, hydrogen, helium, and alkali metal (e.g., cesium, potassium, and sodium). The envelope and working fluid pair may be selected for efficient heat transfer over an operating temperature range and for compatibility (e.g., to avoid problems such as non-condensable gas generation, material transport, and corrosion). In some embodiments, heat pipe 710a includes a metallic envelope and a working fluid, and has an operating temperature range of 20° C. to 150° C. The metallic envelope may be made of aluminum, copper, steel, stainless steel, or other high-performance alloys. The working fluid may be a phase-charging coolant, such as ammonia, ethanol, methanol, water, refrigerant, nitrogen, oxygen, neon, hydrogen, helium, alkali metal, and the like.

Heat pipe 710a may be a sealed system roughly comprising evaporator section 730 and condenser section 740. For example, evaporator section 730 contains the working fluid as both a saturated liquid and a vapor (gas phase). In operation, heat from battery cells 350 may be received by side surfaces 720 (e.g., evaporator section 730), vaporizing the saturated liquid. The vapor can travel (up) to condenser section 740 (e.g., via convection), where it is cooled and turned back to a saturated liquid. The condensed liquid can return to evaporator section 730 (e.g., via gravity, capillary action, etc.).

Figure 7B:
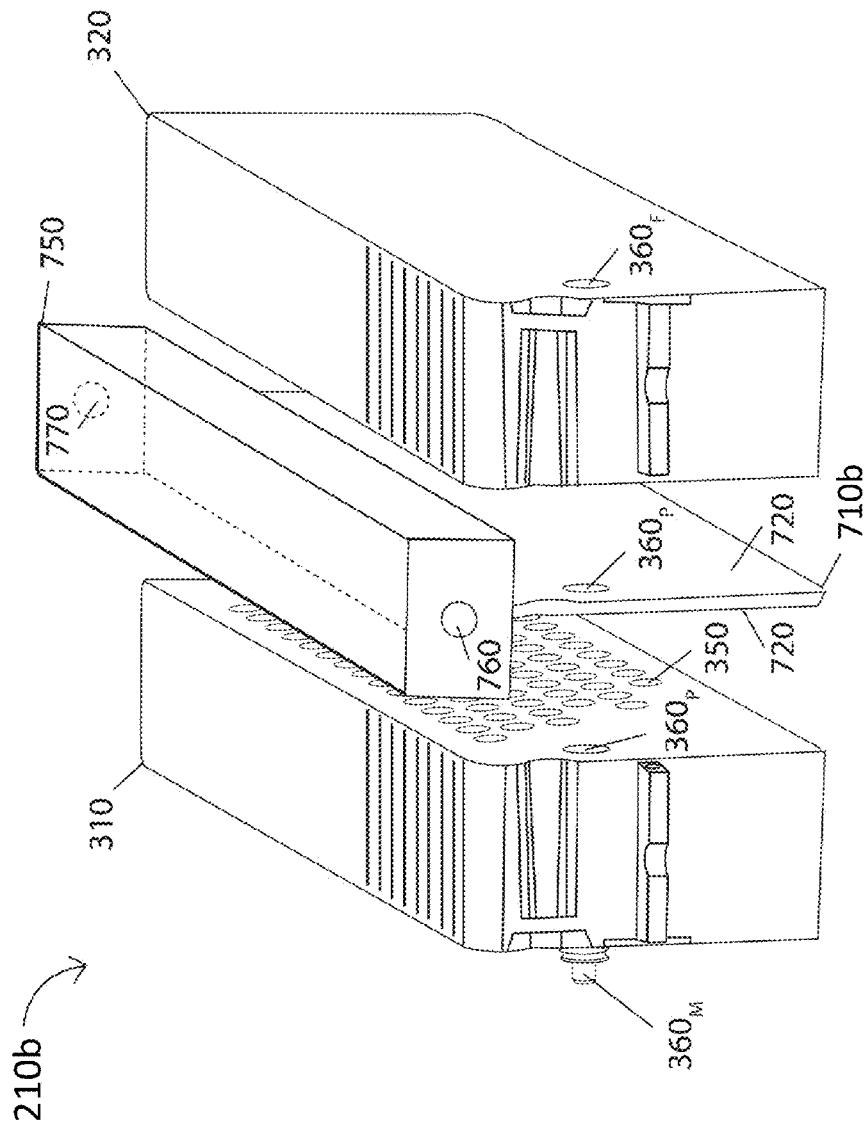

FIG. 7B illustrates an apparatus for heat transfer in battery module 210b, according to some embodiments. Battery module 210b can comprise two half modules 310 and 320 and battery cells 350, as were described in relation to FIGS. 3 and 7A. Main power connector 360 (as described in relation to FIG. 3) can be represented by male main power connector $360_M$, optional main power connector openings $360_P$ (e.g., associated with half module 310, half module 320 (not depicted in FIG. 7B), and heat pipe 710b) and female main power connector $360_F$. In some embodiments, optional main power connector opening $360_P$ (e.g., of heat pipe 710b) can be an electrical connector coupled to at least one electrical connector of half modules 310 and 320 (e.g., an associated main power connector opening $360_P$). In some embodiments, battery module 210b does not include blast plate 420 (FIG. 4).

As shown in FIG. 7B, a condenser section of heat pipe 710b is thermally and/or physically coupled to optional heat exchanger 750. Heat exchanger 750 may comprise at least one of aluminum, copper, an alloy of aluminum and copper, and the like. In operation, heat exchanger 750 may receive heat from the condenser section of heat pipe 710b and transfer the heat to another medium, such as coolant or cooling fluid. In some embodiments, heat exchanger 750 comprises aluminum. For example, the coolant can enter heat exchanger 750 through one of ports 760 and 770 (e.g., from a coolant system and/or sub-system) and can exit heat exchanger 750 (e.g., to the coolant system and/or sub-system) through one of ports 770 and 760. An interior of heat exchanger 750 (not shown in FIG. 7B) may comprise a plurality of channels to circulate the coolant inside heat exchanger 750 to efficiently transfer heat from the condenser section of heat pipe 710b to the coolant. For example, the plurality of channels can direct the coolant from one of ports 760 and 770, circulate the coolant inside heat exchanger 750, and direct the coolant to one of ports 770 and 760.

The coolant may be at least one of the following: synthetic oil, water and ethylene glycol (WEG), poly-alpha-olefin (or poly-α-olefin, also abbreviated as PAO) oil, liquid dielectric cooling based on phase change, and the like. In various embodiments, the coolant can be WEG. By way of further non-limiting example, the coolant may be at least one of: perfluorohexane (Flutec PP1), perfluoromethylcyclohexane (Flutec PP2), Perfluoro-1,3-dimethylcyclohexane (Flutec PP3), perfluorodecalin (Flutec PP6), perfluoromethyldecalin (Flutec PP9), trichlorofluoromethane (Freon 11), trichlorotrifluoroethane (Freon 113), methanol (methyl alcohol 283-403K), ethanol (ethyl alcohol 273-403K), and the like.

In some embodiments, the coolant is provided (e.g., pumped) to battery pack 140b (FIG. 2A) in tray 260 (FIG. 2B). Within battery pack 140b, coolant may be circulated to each heat exchanger 750 in battery modules 210b. In this way, heat can be efficiently managed/dissipated and thermal gradient minimized among all battery cells in battery pack 140b, such that a temperature may be maintained at an approximately uniform level. Such a uniform temperature level can sustain a direct current internal resistance (DCIR) of each battery cell at a substantially predefined resistance. Since the DCIR can vary with a temperature, keeping each battery cell in battery pack 140b at a substantially uniform and predefined temperature can result in each battery cell having substantially the same DCIR. Because a voltage across each battery cell can be reduced as a function of its respective DCIR, each battery cell in battery pack 140b may experience substantially the same loss in voltage. In this way, each battery cell in battery pack 140b can be maintained at approximately the same capacity and imbalances between battery cells in battery pack 140b can be minimized.

FIG. 7C shows some example constituent components—half module 310, heat pipe 710b, optional heat exchanger 750, and half module 320—assembled into battery module 210a, according to various embodiments. In some embodiments, heat pipe 710b has width 780 within a range of 2 mm-4 mm and heat exchanger 750 has width 485 within a range of 1 mm-10 mm. In various embodiments, heat pipe 710b and heat exchanger 750 have length 490 in a range of 250 mm-400 mm.

As would be readily appreciated by one of ordinary skill in the art, various embodiments described herein may be used in additional applications, such as in energy-storage systems for wind and solar power generation. Other applications are also possible.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present disclosure and its practical application, and to enable others of ordinary skill in the art to understand the invention for various embodiments with various modifications as are suited to the particular use contemplated.

What is claimed is:

1. A cooling subsystem for a vehicle energy-storage system comprising:
 a heat pipe disposed between two battery modules, the heat pipe being thermally coupled to each of a plurality of cells of the two battery modules at an end of each cell, the heat pipe comprising an envelope and a working fluid, the heat pipe transferring heat from the plurality of cells;
 a heat exchanger thermally coupled to the heat pipe, the heat exchanger receiving heat from the heat pipe; and
 a coolant system for circulating a coolant pumped into a battery tray such that a plurality of battery modules disposed in the battery tray are at approximately the same predetermined temperature, the heat exchanger being thermally coupled to the coolant system using a coolant input port and a coolant output port.

2. The cooling subsystem of claim 1, wherein the heat exchanger comprises at least one of: aluminum, copper, and an aluminum-copper alloy.

3. The cooling subsystem of claim 1, wherein the coolant comprises at least one of: synthetic oil, water and ethylene glycol (WEG), poly-alpha-olefin oil, and liquid dielectric cooling based on phase change.

4. The cooling subsystem of claim 1 wherein, the envelope comprises at least one of: aluminum, copper, steel, stainless steel, and a high-performance alloy.

5. The cooling subsystem of claim 4, wherein an exterior surface of the envelope comprises at least one of: aluminum oxide, diamond powder based materials, and boron nitride.

6. The cooling subsystem of claim 5, wherein the working fluid comprises at least one of: ammonia, ethanol, methanol, water, refrigerant, nitrogen, oxygen, neon, hydrogen, helium, and alkali metal.

7. The cooling subsystem of claim 1, wherein the envelope comprises aluminum, an exterior surface of the envelope comprises aluminum oxide, and the working fluid comprises ammonia.

8. The cooling subsystem of claim 1, wherein the heat pipe comprises two sides that are substantially planar.

9. A cooling system for a vehicle energy-storage system comprising:
a heat pipe comprising a planar surface thermally coupled to a plurality of cells of a battery module of the vehicle energy-storage system, an envelope being configured to transfer heat from the plurality of cells; and
a heat exchanger coupled to the envelope and configured to transfer the heat from the envelope, the heat exchanger comprising a channel configured to direct a working fluid through the heat exchanger to transfer the heat from the heat exchanger,
wherein the heat exchanger is thermally coupled to a coolant system for circulating a coolant pumped into a battery tray such that a plurality of battery modules disposed in the battery tray are at approximately the same predetermined temperature, the heat exchanger being thermally coupled to the coolant system through a coolant input port and a coolant output port.

10. The cooling system of claim 9, wherein the envelope has a width of about 2 to 4 mm.

11. The cooling system heat pipe of claim 10, wherein the heat exchanger comprises at least one of: aluminum, copper, and an aluminum-copper alloy.

12. The cooling system of claim 9, wherein the coolant comprises at least one of: synthetic oil, water and ethylene glycol (WEG), poly-alpha-olefin oil, and liquid dielectric cooling based on phase change.

13. The cooling system of claim 9 wherein, the envelope comprises at least one of: aluminum, copper, steel, stainless steel, and a high-performance alloy.

14. The cooling system of claim 13, wherein an exterior surface of the envelope comprises at least one of: aluminum oxide, diamond powder based materials, and boron nitride.

15. The cooling system of claim 14, wherein the working fluid comprises at least one of: ammonia, ethanol, methanol, water, refrigerant, nitrogen, oxygen, neon, hydrogen, helium, and alkali metal.

16. The cooling system of claim 9, wherein the envelope comprises aluminum, an exterior surface of the envelope comprises aluminum oxide, and the working fluid comprises ammonia.

17. The cooling system of claim 9, wherein the planar surface of the heat pipe is coupled to the plurality of cells through end sections of the plurality of cells.

* * * * *